Figure 2:
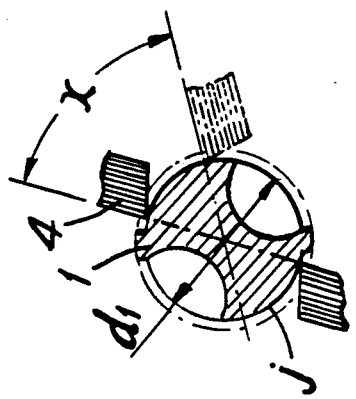

United States Patent [19]
Schmigalla et al.

[11] Patent Number: 5,265,988
[45] Date of Patent: Nov. 30, 1993

[54] DRILLING CHAMFERING TOOL

[75] Inventors: Christian Schmigalla, Leonberg, Fed. Rep. of Germany; Leo Nigg; Hansuli Nigg, both of Buchs, Switzerland

[73] Assignee: MAS Maschinenbau AG, Sevelen, Switzerland

[21] Appl. No.: 499,523

[22] PCT Filed: Oct. 16, 1989

[86] PCT No.: PCT/EP89/01224
§ 371 Date: Jun. 28, 1990
§ 102(e) Date: Jun. 28, 1990

[87] PCT Pub. No.: WO90/04474
PCT Pub. Date: May 3, 1990

[30] Foreign Application Priority Data

Oct. 17, 1988 [DE] Fed. Rep. of Germany ... 8812999[U]
Nov. 24, 1988 [DE] Fed. Rep. of Germany ... 8814843[U]

[51] Int. Cl.5 ............................................. B23B 51/00
[52] U.S. Cl. .................................. 408/225; 408/239 R
[58] Field of Search ............... 408/224, 225, 233, 238, 408/239 R, 239 A, 146, 226, 223, 199

[56] References Cited
U.S. PATENT DOCUMENTS 3,557,419 1/1971 Flannery ........................ 408/226
4,714,390 12/1987 Eckle et al. ................... 408/239 R
4,784,536 11/1988 Pfalzgraf ........................ 408/146
4,971,491 11/1990 Cook .............................. 408/146
5,071,295 12/1991 Greig ............................. 408/225

FOREIGN PATENT DOCUMENTS 2541123 4/1976 Fed. Rep. of Germany ... 408/239 A
3125480 1/1983 Fed. Rep. of Germany ...... 408/225
3425337 1/1986 Fed. Rep. of Germany ...... 408/238
3428481 1/1986 Fed. Rep. of Germany ...... 408/146

Primary Examiner—Daniel W. Howell
Attorney, Agent, or Firm—Anderson Kill Olick & Oshinsky

[57] ABSTRACT

Drilling/chamfering tool, comprising a tool holder (3) which holds at its front end a chamfering head (2) and a commercially available drill (1) with cylinder shaft, and appropriate adjusting and cutting elements. It is essential in the drilling/chamfering tool that the cylinder shaft (D) of the drill (1) is greater than or equal to the drill diameter (g) and has at least one clamping surface (g). The chamfering head (2) is rotatable 360° about the tool axis (a), while two chamfer cutting blades (4) are arranged diagonally opposite each other in the chamfering head (2) and are clamped adjustably against the diameter ($d_1$) of the spiral back (j) essentially at chamfer angle (λ). The particular advantage is obtained that optimum cooling and no accumulation of chips is achieved and a modular tool system with uncomplicated availability and inexpensive procurement and storage is provided.

11 Claims, 2 Drawing Sheets

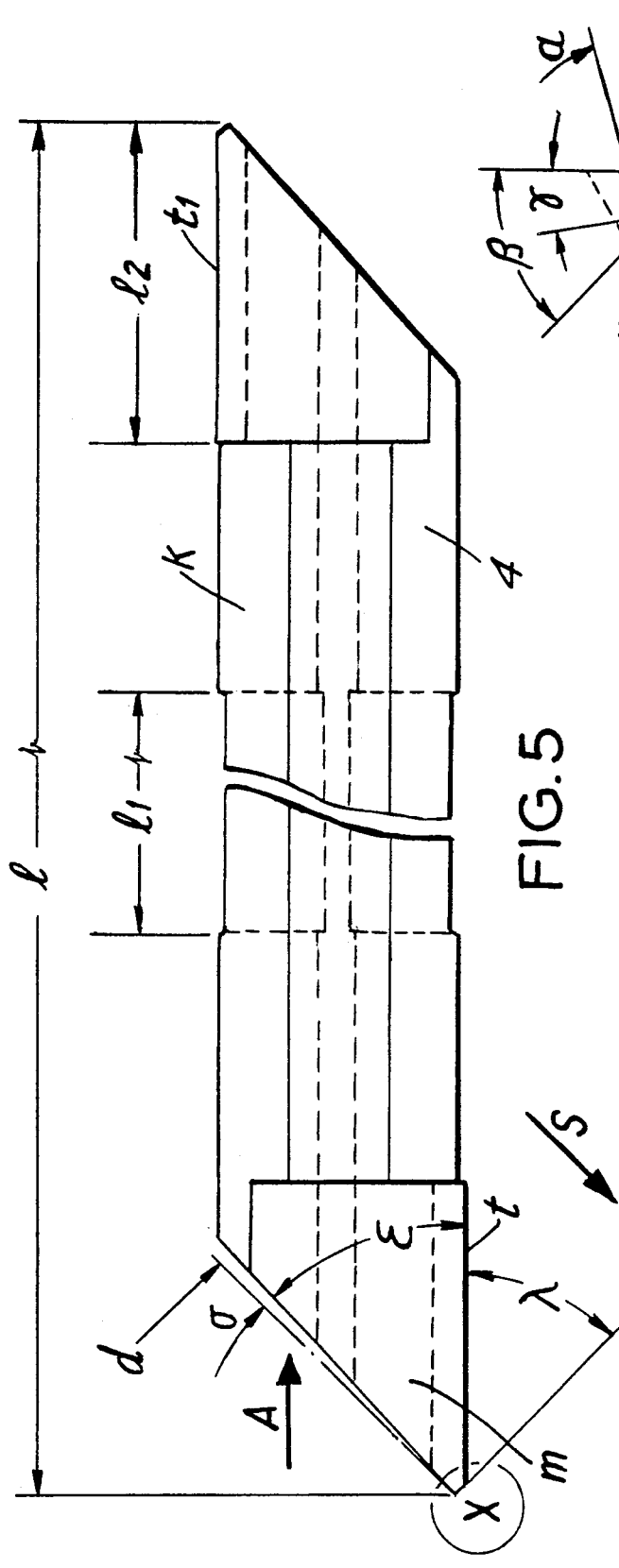
FIG.5
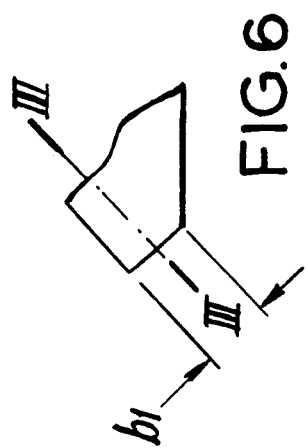
FIG.6
FIG.7
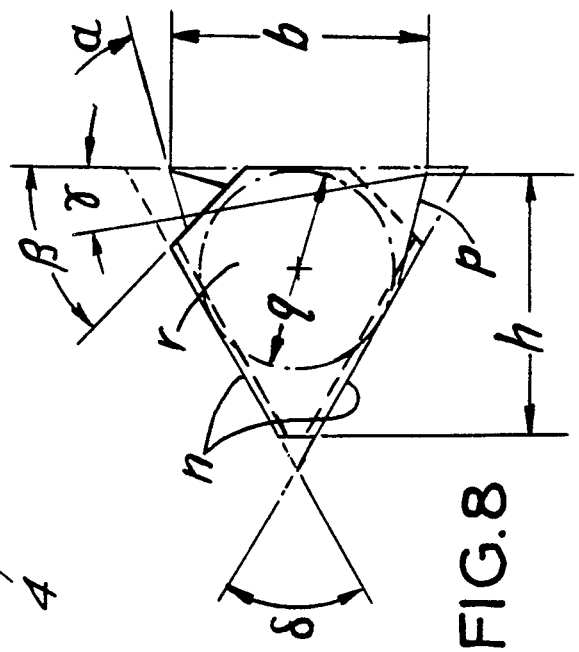
FIG.8

DRILLING CHAMFERING TOOL

The invention relates to a drilling/chamfering tool including a tool holder which holds at its front end a chamfering head and a commercially available drill with cylinder shaft, and appropriate adjusting and cutting elements, in accordance with the preamble of claim 1.

The requirement of deburring or chamfering a bore in the same work step has in the past been carried out with a series of different tool combinations. Tools known for this purpose are, for example, step drills with fixed step lengths, twist drills with chamfering rings which are screwed or clamped to the drills, and twist drills with spring-mounted countersunk sleeves. The chamfer cutting blades of these tools are constructed in different embodiments either ground or clamped (see DE-AS 20 62 757, DE-OS 28 00 077, DE-OS 36 10 016).

Modern NC-manufacture is making new requirements of the tool system with respect to planning, administration and availability of tools. Among these requirements are:

- high positional and shape accuracy and surface quality of the bores to be manufactured, preferably in one work step,
- increased chip-producing rates with drills of coated hard metal with new cutting edge and groove geometries,
- high stiffness and load-bearing capacities which facilitate processing with high cutting values,
- advantageous chip-forming and internal coolant supply which ensure a problem-free chip removal even in materials producing long chips,
- tool holders of modular construction with defined cutting points which reduce the number of different types of tools and lead to cost savings in administration, storage and procurement of tools,
- quick changing systems and a simple tool adjustment/tool clamping which is adapted for the purpose and which reduce the work required for assembly and initial adjustment,
- quick availability of tools with different drill diameters, chamfer angles and different spindle supports using relatively few structural components.

These relatively substantial requirements are not met by known tools for drilling and chamfering.

The deficiencies occurring most frequently are the accumulation of chips in the region of the chamfer cutting edges and the necessity to make available a large number of tools when a drill and a chamfering tool is to be provided for each bore diameter. For example, DE-OS 28 00 077 shows a drilling/chamfering tool which includes a tool holder which supports at its front end a clamping head and a twist drill with a cylinder shaft and which has at its rearward end a tool support with a possibility of adjusting the depth of the drill. The cutting head is exchangeably fastened on the tool holder by means of a screw thread, while the drill is moved or fixed with respect to rotation by means of holding screws which engage in the grooves. The drill proper has essentially equal drill and shaft diameters. Accordingly, it is necessary to provide for each bore diameter a drill, a cutting head and a tool holder. Because of the large number of different tools, this means that the procurement is expensive and a large number of tools must be kept in store.

It is the object of the invention to provide a tool of the above-described type which does not have the above-mentioned disadvantages and which meets in an optimum manner the described modern requirements of tool systems. Particularly, an accumulation of chips is to be avoided and the tool system should be of modular construction with uncomplicated availability and inexpensive procurement and storage.

This object is met by a drilling/chamfering tool of the described type with the characterizing features of claim 1.

Additional developments and different embodiments are mentioned in the dependent claims.

Accordingly, it is an essential feature of the invention that the cylinder shaft of the twist drill is greater than or equal to the bore diameter and has at least one clamping surface. This leads to the advantage that a large number of different drills with different bore diameters can be received in the tool holder without requiring any additional operation, wherein clamping or moving of the drill takes place in an area into which chips do not penetrate, so that clamping does not impair the flow of chips.

The chamfering head of the tool according to the invention is constructed so as to be rotatable by 360° about the tool axis, so that it is possible for each drill position to adjust the position of the chamfer cutting edges which is favorable to the chip removal in the drill portion (L) which projects out of the chamfering head. The adjustment of the chamfering head on the tool holder can be performed by means of driving pins which act as indexing pins and by means of fixing screws of the chamfering head which radially engage in a circumferential groove of the tool holder. This ensures that the chamfer cutting blades rest against the spiral back of the drill in an optimum manner at any drill length adjustment.

Finally, it is an essential feature of the invention that in each chamfering head are arranged two chamfer cutting blades diagonally opposite each other and that the chamfer cutting blades are clamped so as to be adjustable relative to the diameter $d_1$ of the spiral, essentially at a chamfer angle "$\lambda$" (angle relative to the tool axis). This provides the advantage that twist drills with different bore diameters can be mounted in the same tool holder on which the chamfering head is mounted. Only the two chamfer cutting blades must be appropriately moved and clamped, so that always an optimum, full contact of the chamfer cutting blades on the spiral back takes place.

Consequently, the substantial advantage is achieved that, due to the rotatability or convertability of the chamfering head about 360°, a position of the chamfer cutting blades can be achieved in a certain area of the spiral back of the drill which is favorable to chip cutting. Since, in addition, a drill is provided for each bore diameter, the chamfer head and the tool holder are suitable for an entire series of different diameters, so that it is possible to process the entire bore diameter range of from 5 to 25 mm with a small number of chamfering heads and holders. The criterion for selection is the shaft diameter of the drill. Commercially available drills are used without requiring any additional processing.

In accordance with a further development of the invention, the drills are clamped in the tool holder through clamping surfaces and by means of radial or appropriately inclined clamping screws depending on whether the clamping surfaces are straight or inclined. It is advantageous to arrange always two clamping screws one behind the other in axial direction, so that clamping of the drill shaft can be carried out in an optimum manner even if the drill is pushed out of the holder to a relatively substantial extent.

In accordance with another embodiment of the invention, it is a great advantage if a quick-change system (for example, ABS-coupling) with internal coolant supply through the spindle is provided at the rearward end of the tool holder, wherein the quick exchange may be carried out manually or automatically.

It is also very advantageous if an essentially annular coolant pocket is provided in the area of separation between the chamfering head and the holder. When the spiral grooves of the drill enter the region of the coolant pocket, as is the case in a drilling position with small drilling depths, the penetration of chips into the region between the drill and the chamfering head is prevented by the coolant flow which emerges under pressure in the drilling direction. Thus, an accumulation of chips cannot take place even when the spiral grooves enter enter the interior of the chamfering head.

In accordance with the invention, it is a further advantage if two double-edged chamfer cutting blades of the same type are provided. The chamfer cutting blades may have an adjusting angle of up to 45° and, as mentioned above, are arranged adjustable and clampable relative to the spiral back (undercut) of the drill.

It is also an advantage if each chamfer cutting blade has a profile guide at its underside which rests against the spiral back diameter of the drill and each chamfer cutting blade is clamped in the guide by means of a clamping piece or a countersunk screw. A large chip pocket may be provided above the chamfer cutting blades, wherein the cutting and clamping elements of the chamber cutting edges are constructed on the same level with the chamfer cutting blades, such that the respective clamping element rests on an inclined clamping surface provided in the clamping area on the longitudinal side of the chamfer cutting blade. Thus, the clamping force of the clamping piece is applied at an angle on the chamfer cutting blade, essentially at an angle of 45°, wherein the chamfer cutting blade is forced in an optimum manner into its angular guidance by, for example, a 60°-V guidance and is locked so as to be non-slidable. Simultaneously, an unimpaired flow of chips is ensured since the grooves are free over their entire length and there are no structural components which engage or extend into the grooves. In addition, the clamping elements do not project above the height of the chamfer cutting blade, so that the flow of chips is again not impaired.

In addition, it is particularly advantageous, in accordance with the invention, if a modular construction with defined points of intersection is provided. The defined points of intersection are axial and radial guidances or fixing points with accurate dimensional tolerances of the components which are essential for the operation, such as, tool holder, chamfering head and tool support. Thus, each tool combination can be assembled without problems with relatively few structural components and little work. Accordingly, bore diameter (d), chamfer angle ($\lambda$), bore depth (L) and adjusting dimension (EM) can be easily adjusted to any type of application with an uncomplicated modular system. The guiding and contact surfaces of the points of intersection ($s_1, s_2$) are constructed in such a way that the structural components can be easily slid on and also easily removed. An excellent concentricity and repeat accuracy of the tool position is ensured. Finally, in case of wear, breakage or damage to the tool, each tool component individually or the entire tool can be replaced quickly and without problems (in part by actuating a single clamping screw).

The modular construction with defined points of intersection and an internal coolant supply facilitate a problem-free assembly in accordance with an uncomplicated modular system, a problem-free operation and, together with a coding system, the use on automatic manufacturing systems.

In the following, the invention shall be explained in detail with the aid of embodiments under reference to the drawing.

Figure 4:
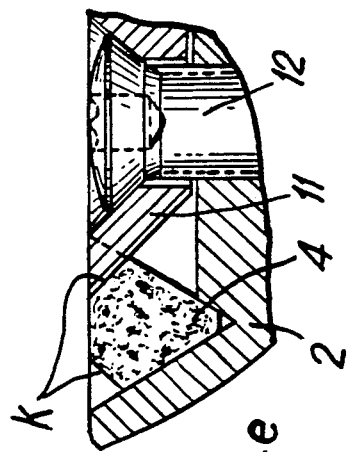
Figure 1:
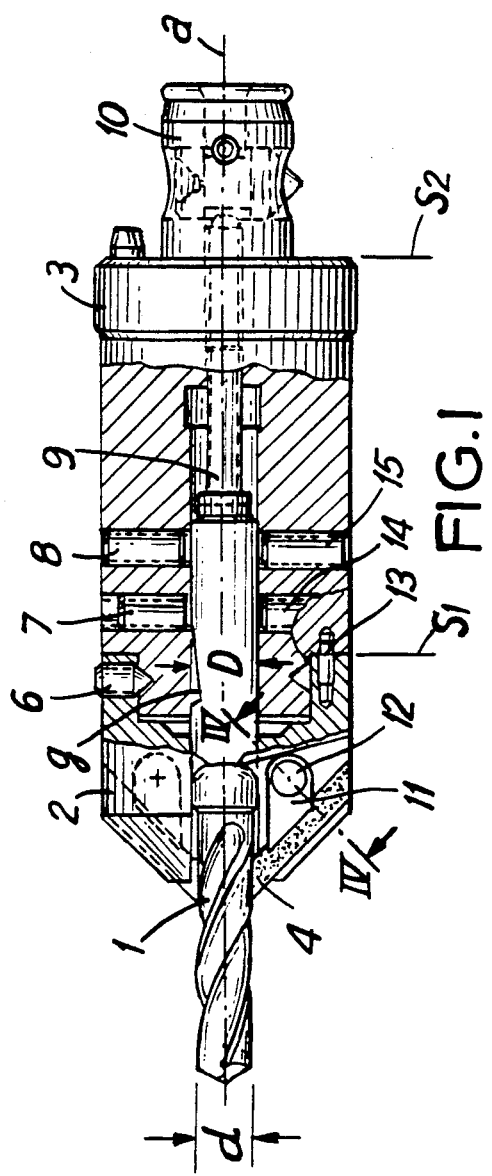
Figure 3:
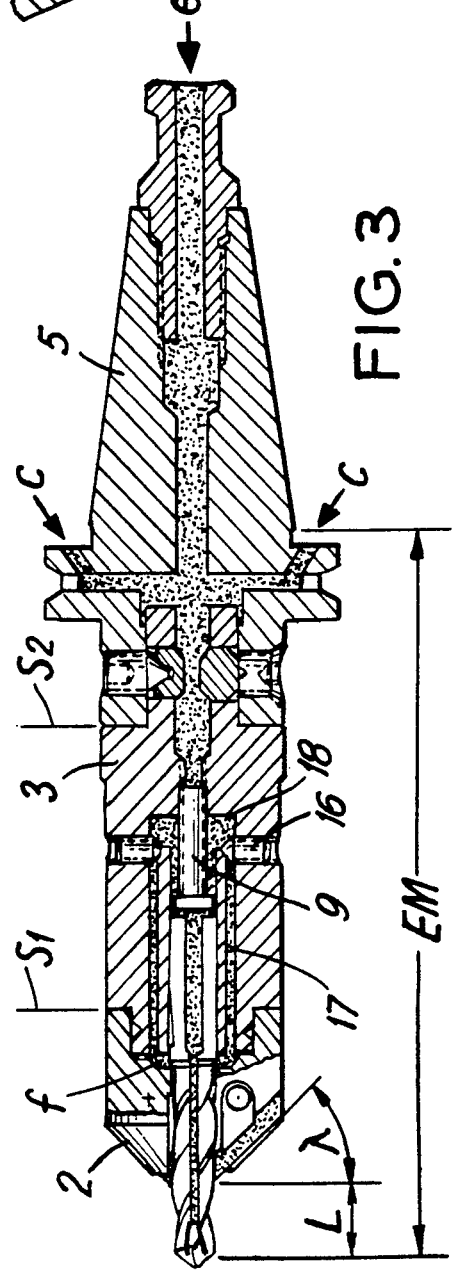

In the drawing:

FIG. 1 shows a partially cross-sectional view of a drilling/chamfering tool according to the invention, without a tool shaft, with ABS-quick-change system, preadjusted in accordance with the desired tool data: d, L and $\lambda$ of an adjustment list, FIG. 2 is a radial cross-sectional view of the twist drill of the tool with two chamfer cutting blades in an adjustment range which is favorable for chip cutting, FIG. 3 shows a cross-sectional view of a drilling/chamfering tool of modular construction with a tool shaft mounted thereon, with an internal coolant supply centrally through the spindle or through the spindle flange, FIG. 4 is a cross-sectional view along lines IV—IV of FIG. 1, illustrating the clamping of the chamfer cutting blades, FIG. 5 shows a large scale top view of a chamfer cutting blade, FIG. 6 shows a detail X of FIG. 5, with enlarged illustration of the auxiliary cutting blade, FIG. 7 is a cross-sectional view along lines III—III of FIG. 6 showing the auxiliary angle, FIG. 8 is an illustration of the end face in the direction of arrow A of FIG. 5.

The drilling/chamfering tool according to the invention includes a commercially available twist drill 1 whose cutting edge and groove geometry provides short drill chips even in materials which produce long chips, wherein the chip removal is facilitated by a particular shape of the grooves.

For deeper bores, internal cooling ducts are provided.

The drilling depth L is adjusted by means of adjusting screws 9. The adjusting dimension EM results from L and the tool shaft 5 used.

The drill 1 is clamped on the shaft D on an inclined clamping surface g by means of a clamping screw 7 (or 8 in small drilling depths). Drills with a straight clamping surface are cut by means of a clamping screw 14, or 15 in small drilling depths.

The chamfering head 2 is constructed for receiving two chamfer cutting blades 4 of the same type. The chamfer cutting blades 4 rest on the diameter $d_1$ of the spiral back j through a guide having an appropriate profile and the chamfer cutting blades 4 are fixed by means of a clamping piece 11 and a countersunk screw 12.

As particularly shown in FIG. 5, the chamfer cutting blade 4 has an oblong body with a dimension 1 which, seen in the cross-section of FIG. 8, is shaped in the manner of an equilateral triangle with $\delta = 3 \times 60°$ and inscribed circle q. The body is provided at both ends at the longitudinal sides and on opposite sides with a cutting edge t and $t_1$, respectively, each having a length $l_2$. They form the width b of the chamfer cutting blade and they each have a rake angle $\gamma$ and a clearance angle $\alpha$. For protecting the cutting edge, the cutting edge tip (FIG. 6/detail X) is provided with a side rake $b_1$ and a side clearance angle $\alpha_1$.

Contact surfaces n arranged at an angle $\delta$ are constructed as guide surfaces of the chamfer cutting blade and are provided in the middle portion with a recess $l_1$ in order to ensure an excellent contact.

On the longitudinal sides of the chamfer cutting blade are arranged on both sides an inclined clamping surface k at an angle $\beta$ for the clamping piece 11. The clamping piece itself has a correspondingly inclined clamping surface (approximately 45°), see particularly FIG. 4. In addition, the chamfer cutting blades 4 have at their bottom side a V-profile inclination, which preferably form a V-angle of approximately 60°. The chamfer cutting blade has on both ends at a distance of preferably about 5 mm a cutting wedge with rake angle and clearance angle.

The chamfer angle $\lambda$ results from the inclination of the chamfer to be produced. In order to ensure the contact of the cutting tip, an angle $\sigma$ is provided between the end face r and the drill diameter d. The sum of the angles $\lambda + \epsilon + \sigma$ resulting 90°.

A compressed blank formed by a sintering process is only finished at the rake surfaces and clearance surfaces and is coated as necessary.

Preferred dimensions of the chamfer cutting blade are:

b = 4.0 mm, finishing tolerance ±0.025
$b_1$ = about 0.1 mm
d = 5-25 mm
$d_1$ = d minus about 0.5 mm
h = about 4.05 mm
l = about 24 mm
$l_1$ = about 6 mm, 0.2 mm deep
$l_2$ = about 5 mm
q = $\phi$2.95 mm, finishing tolerance ±0.05
$\alpha$ = about 15°
$\beta$ = about 45°
$\delta$ = about 60°
$\lambda$ = about 10°
$\kappa$ = max. 60°
$\sigma$ = max. 2°

In order to obtain a position x of the drill 1 relative to the chamfer cutting blades 4 advantageous for chipping, the chamfering head 2 is rotatable relative to the tool holder 3 about 360° and is simultaneously constructed so as to be placeable into, for example, twenty four positions, wherein clamping in these positions is effected through at least two axial driving pins 13 and three fixing screws 6 which engage in circumferential grooves.

The tool holder 3 is constructed at its front end for receiving the drill 1 and the chamfering head 2 and is provided at its rearward end with a quick change system 10 which permits a sufficient central coolant flow.

In the holder 3, the coolant is simultaneously supplied through the adjusting screw 9 to the drill 1 and is conducted into an annular coolant pocket f. This is effected by means of at least two axial coolant connecting bores 17 which, in turn, are in communication with an annular duct 18 provided at the level of the adjusting screw 9. The annular duct 18 is connected to the central coolant supply e through the adjusting screw 9 or through extended connecting bores 19 and additional radial connecting bores, not shown. Thus, when the spiral grooves of the drill 1 enter this area, coolant is discharged under pressure and the penetration of jets is prevented.

By means of radial threaded pins 16 which extend into the bores 17 and have a throttling effect, the coolant flow can be supplied and distributed as necessary to the drill and the coolant pocket f. This is of particular significance, for example, in the case of a vertical operating position and a material which is difficult to cut, so that the chip removal is improved and the cooling of the cutting edges of the drill is effected exclusively through the drill.

An excellent chip removal was taken into particular consideration in constructing the components. For example, the grooves of the drill 1 are free over the entire length, without any structural components which would engage or project into the grooves. Chip pockets under chamfering head 2 have a large volume and plane, smooth surfaces without projecting parts. The structural measures for the excellent chip removal in connection with the coolant supply in accordance with the invention particularly in the chamfer cutting blade region have led to good results in practice.

The modular construction of the tool with the described advantages meets in an optimum manner the high requirements which tool systems for automatic manufacturing should meet.

In addition to the illustrated embodiments, the chamfering head and the tool holder can be constructed in such a way that, depending on the requirements, several diameters, end faces and chamfers can be manufactured in steps.

The invention is not limited to the described and illustrated examples. The invention also includes all further developments derived therefrom or partial applications.

What is claimed is:
1. A drilling/chamfering tool, comprising:
a tool holder having an axis and a front end;
a drill receivable in the front end of the tool holder and including a drilling portion having a spiral back and a first diameter, and a cylinder shaft having a second diameter, which is at least equal to the first diameter of the drilling portion, and at least one clamping surface;
a chamfering head rotatable 360° about the tool holder axis;
two chamfer cutting blades supported in the chamfering head diagonally opposite each other and defining each a chamfer angle; and
means for clamping the chamfer cutting blades adjustably relative to the diameter of the spiral back essentially at the chamfer angle.
2. A drilling/chamfering tool according to claim 1, wherein the tool holder comprises one of clamping screws inclined to the axis of the tool holder and radially extending clamping screws for clamping a drill having one of an inclined clamping surface and a straight clamping surface, respectively.
3. A drilling/chamfering tool according to claim 1, wherein the first diameter (d) of the drilling portion is up to 7 mm smaller than the second diameter of the cylinder shaft and the smallest first diameter is 5 mm, said drilling/chamfering tool further comprising an axial adjusting screw for adjusting the drilling depth in a range L min.=1 to 1.5 d and L max.=the length of the drilling portion.

4. A drilling/chamfering tool according to claim 1, further comprising axial driving pins and radial fixing screws, which engage in a circumferential groove of the tool holder, for precise fixedly positioning of the chamfering head on the tool holder.

5. A drilling/chamfering tool according to claim 1, further comprising a coolant pocket in the forward area of an intersection between the chamfering head and the tool holder, the coolant pocket being connected to a central coolant supply through axial coolant connecting bores and an annular duct provided on the level of a screw for adjusting a drilling depth.

6. A drilling/chamfering tool according to claim 5, wherein radial threaded pins are provided in the tool holder and extend into bore a in the drill for throttling a coolant flow.

7. A drilling/chamfering tool according to claim 1, wherein the two chamfer cutting blades are of the same type and formed each as a double-edge chamfer cutting blade, wherein a cutting wedge with a rake angle and a clearance angle is provided, and a compressed blank for each chamfer cutting blade is machined only at angle surfaces.

8. A drilling/chamfering tool according to claim 7, wherein a guide with an adapted profile, preferably wedge-shaped, is provided between the underside of each chamber cutting blade and the spiral back, and wherein each chamfer cutting blade is clamped in the chamfering head in the respective guide by a clamping piece, which does not project above an upper cutting surface, and by a countersunk screw.

9. A drilling/chamfering tool according to claim 1, wherein grooves of the drill are free over the entire length thereof, without components engaging or projecting into the grooves, for an unimpaired flow of chips.

10. A drilling/chamfering tool according to claim 1, wherein a spacious chip pocket is provided in the chamfering head essentially above the chamfer cutting blades, and wherein clamping elements for the cutting blades are provided on at most the same level therewith and are constructed such that one clamping element rests against an inclined clamping surface provided in the clamping region at the longitudinal edge of the chamfer cutting blade.

11. A drilling/chamfering tool according to claim 1, wherein a modular construction with defined points of intersection is provided, wherein one of axial and radial guides, dimensionally accurate contacts, and fixing means of intersecting components are provided in the points of intersection for a modular change of components, in case of at least one of wear, breakage, damage and refitting.

* * * * *